US012086254B2

(12) United States Patent
Webster et al.

(10) Patent No.: US 12,086,254 B2
(45) Date of Patent: Sep. 10, 2024

(54) ADJUSTING ROLE-BASED ACCESS CONTROL OF A USER BASED ON BEHAVIOR DATA OF THE USER

(71) Applicant: International Business Machines Corporation, Armonk, NY (US)

(72) Inventors: Stephen William Webster, Austin, TX (US); Margaret Kathryn Lewis, Austin, TX (US); Hanna Oh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 153 days.

(21) Appl. No.: 17/131,337

(22) Filed: Dec. 22, 2020

(65) Prior Publication Data
US 2022/0198015 A1   Jun. 23, 2022

(51) Int. Cl.
G06F 21/57 (2013.01)
(52) U.S. Cl.
CPC ........ G06F 21/57 (2013.01); *G06F 2221/034* (2013.01)
(58) Field of Classification Search
CPC ............................ G06F 21/57; G06F 2221/034
See application file for complete search history.

(56) References Cited

U.S. PATENT DOCUMENTS

| | | | |
|---|---|---|---|
| 9,087,148 B2 | 7/2015 | Giblin et al. | |
| 9,137,265 B2 | 9/2015 | Chari et al. | |
| 9,154,507 B2 | 10/2015 | Ashley et al. | |
| 9,461,972 B1 | 10/2016 | Mehta | |
| 9,785,782 B2 | 10/2017 | Bulumulla et al. | |
| 9,923,927 B1* | 3/2018 | McClintock | H04L 63/0846 |
| 10,116,679 B1* | 10/2018 | Wu | H04L 63/102 |
| 10,454,934 B2 | 10/2019 | Parimi et al. | |
| 10,496,842 B1* | 12/2019 | Ren | H04L 63/1433 |
| 10,715,507 B1* | 7/2020 | Spears | G06Q 20/405 |
| 11,235,248 B1* | 2/2022 | Orrino | G06N 20/00 |

(Continued)

OTHER PUBLICATIONS

Rath et al, "Adaptive Risk-Aware Access Control Model for Internet of Things". 2017 International Workshop on Secure Internet of Things (SIoT). 2017. p. 40-49. (Year: 2017).*

(Continued)

*Primary Examiner* — Carl G Colin
*Assistant Examiner* — Zhe Liu
(74) *Attorney, Agent, or Firm* — Zilka-Kotab, P.C.

(57) ABSTRACT

A computer-implemented method according to one approach includes receiving behavior data associated with a user's behavior on at least one device. The behavior data is based on one or more of an email account, a browser history, password usage and online behavior history. Risk levels associated with the behavior data are generated and role-based risk events are predicted based on the behavior data. The method further includes simulating the role-based risk events based on the risk levels, and adjusting role-based access control of the user based on results of the simulating. A computer program product for adjusting role-based access control according to another approach includes a computer readable storage medium having program instructions embodied therewith. The program instructions are readable and/or executable by a computer to cause the computer to perform the foregoing method.

25 Claims, 8 Drawing Sheets

(Continued)

(56) References Cited

U.S. PATENT DOCUMENTS

| | | | | |
|---|---|---|---|---|
| 2013/0097709 | A1* | 4/2013 | Basavapatna | H04L 63/20 726/25 |
| 2015/0312262 | A1* | 10/2015 | Doshi | H04L 67/535 726/1 |
| 2016/0182544 | A1* | 6/2016 | Adjaoute | G06Q 30/0185 705/7.15 |
| 2016/0364673 | A1* | 12/2016 | Byham | G06Q 10/06398 |
| 2016/0366167 | A1* | 12/2016 | Yumer | H04L 63/1433 |
| 2017/0346824 | A1* | 11/2017 | Mahabir | H04L 63/1433 |
| 2018/0069866 | A1* | 3/2018 | Chalmers | H04L 63/20 |
| 2018/0103052 | A1 | 4/2018 | Choudhury et al. | |
| 2018/0191770 | A1* | 7/2018 | Nachenberg | H04L 63/1441 |
| 2018/0375892 | A1* | 12/2018 | Ganor | G06Q 10/0635 |
| 2019/0258799 | A1* | 8/2019 | Harris | H04L 63/101 |
| 2019/0260764 | A1* | 8/2019 | Humphrey | H04L 51/212 |
| 2020/0021620 | A1* | 1/2020 | Purathepparambil | H04L 63/102 |
| 2020/0076818 | A1* | 3/2020 | Krishnan | H04L 63/102 |
| 2020/0106787 | A1* | 4/2020 | Galinski | G06F 21/554 |
| 2020/0137105 | A1* | 4/2020 | Endler | G06F 21/6218 |
| 2020/0137107 | A1* | 4/2020 | Jevans | G06F 21/577 |
| 2020/0177612 | A1* | 6/2020 | Kras | H04L 63/1433 |
| 2020/0233955 | A1* | 7/2020 | Ramzan | G06F 21/552 |
| 2020/0267183 | A1* | 8/2020 | Vishwanath | H04L 63/1483 |
| 2020/0302074 | A1* | 9/2020 | Little | G06F 21/6218 |
| 2020/0314126 | A1* | 10/2020 | Schmugar | H04W 12/12 |
| 2021/0390470 | A1* | 12/2021 | Clearwater | G06Q 10/0635 |
| 2022/0083652 | A1* | 3/2022 | Ransford | G06F 21/577 |
| 2022/0247776 | A1* | 8/2022 | Hecht | H04L 63/205 |
| 2022/0394052 | A1* | 12/2022 | Grossman-Avraham | H04L 63/1416 |

OTHER PUBLICATIONS

Ma et al., "Risk Analysis in Access Control Systems," IEEE Xplore, Sep. 2010, 8 pages.

Evina et al., "Risk Management in Access Control Policies," Position papers of the Federated Conference on Computer Science and Information Systems, ACSIS, vol. 13, 2017, pp. 107-112.

HCL Technologies, "Unified reporting and predictive analytics software," DRYiCE MyXalytics, 2020, 8 pages, retrieved from https://www.dryice.ai/resource/brochure/dryice-myxalytics#:~:text=DRYiCE%20MyXalytics%20is%20an%20intelligent,into%20intuitive%20and%20insightful%20reports.

Anonymous, "Role-based access in a multi-customer computing environment using shared user identities," IP.com Prior Art Database, Technical Disclosure No. IPCOM000229315D, Jul. 22, 2013, 6 pages.

Anonymous, "Centralized Security Role Masking in a Cloud Environment," IP.com Prior Art Database, Technical Disclosure No. IPCOM000244291D, Nov. 30, 2015, 4 pages.

Anonymous, "Role-based access as a Service (RaaS)," IP.com Prior Art Database, Technical Disclosure No. PCOM000258493D, May 16, 2019, 6 pages.

Anonymous, "NIST Cloud Computing Program," NIST, Information Technology Laboratory, Nov. 13, 2013, pp. 1-2, retrieved from www.nist.gov/itl/cloud/.

Mell et al., "The NIST Definition of Cloud Computing," Version 15, Oct. 7, 2009, pp. 1-2.

Mell et al., "The NIST Definition of Cloud Computing," Recommendations of the National Institute of Standards and Technology, NIST Special Publication 800-145, Sep. 2011, pp. 1-7.

CSRC, "Cloud Computing," Computer Security Resource Center, Oct. 2017, 3 pages, retrieved from https://csrc.nist.gov/projects/cloud-computing.

Wikipedia, "Computer security," Wikipedia, 2020, 46 pages, retrieved from https://en.wikipedia.org/wiki/Computer_security.

Garg, R., "7 Types of Classification Algorithms," Analytics India Magazine, Jan. 19, 2018, 14 pages, retrieved from https://analyticsindiamag.com/7-types-classification-algorithms/.

Wikipedia, "Statistical classification," Wikipedia, 2020, 6 pages, retrieved from https://en.wikipedia.org/wiki/Statistical_classification.

* cited by examiner

ADJUSTING ROLE-BASED ACCESS CONTROL OF A USER BASED ON BEHAVIOR DATA OF THE USER

BACKGROUND

The present invention relates to cybersecurity, and more specifically, this invention relates to adjusting role-based access control of a user based on behavior data of the user.

Cybersecurity includes security hardware and protocols that aim to protect computer systems and networks from being compromised. Specifically, cybersecurity aims to protect the hardware, software, and/or electronic data of such computer systems and networks from being accessed, distributed, stolen, shared, etc., against the intentions of the lawful owner. Frequently, victims of cybersecurity breaches are not aware of the breach for an extended period of time, e.g., until an unauthorized use of information is detected and flagged by a monitoring service, until the victim of the cybersecurity breach realizes that they have been locked out of accessing their data and/or device, until the victim of the cybersecurity breach suspects that their data and/or device has been unintentionally modified or accessed, etc. In other cases, the victims of cybersecurity breaches may quickly become aware of a cybersecurity breach.

As cyber-attacks become more sophisticated over time and increasingly attack operational infrastructure, organizations are left vulnerable. Some users of such organizations may unintentionally contribute to the cause of a cybersecurity event. For example, common cyber-attack methods, such as malware, password attacks, phishing attacks, etc., rely on individuals that exhibit unsafe internet practices in order to gain access to a system. Even where organizations are diligent about reminding and training its members to conduct safe internet practices at all times, in many cases, the organization ends up the victim of a cybersecurity event because a member eventually, and perhaps quite innocently, exhibits unsafe internet practices. Commonly, despite receiving cybersecurity training, a user may exhibit unsafe internet practices based on the user not knowing that they are doing so. This is because some cyber-attack techniques are developed more quickly than companies are able to inform their members on new cyber-attack types.

Online internet practices are often not studied until a cyber-attack occurs, and only then is an investigation performed to determine how the event was able to occur. However, because the cyber-attack has already occurred, such a study is only able to, at most, attempt to mitigate the cyber-attack that has occurred and/or potentially prevent a similar attack from occurring again.

SUMMARY

A computer-implemented method according to one approach includes receiving behavior data associated with a user's behavior on at least one device. The behavior data is based on one or more of an email account, a browser history, password usage and online behavior history. Risk levels associated with the behavior data are generated and role-based risk events are predicted based on the behavior data. The method further includes simulating the role-based risk events based on the risk levels, and adjusting role-based access control of the user based on results of the simulating. Various of these operations reduce the potential for and/or prevent risk events from occurring by identifying user behaviors that cause data and/or infrastructure vulnerabilities, and adjusting role-based access controls to discourage and/or prevent the users from behaving in such a way thereafter. It should be noted that adjusting role-based access control of the user based on results of the simulating actively mitigates risky user behavior that is predicted to be capable of causing risk events, during and/or soon after the user behavior occurs. Accordingly, systems such as computers and/or servers that would otherwise be compromised if risk-events did in fact occur, operate more efficiently because they are not subjected to damaging cyber-attacks.

Adjusting the role-based access control of the user may include reducing administrator privileges of the user in response to a determination that the risk levels exceed a predetermined threshold. Reducing administrator privileges of the user may include maintaining data viewing privileges of the user and revoking data amending privileges of the user. In a company work setting, user productivity is at least in part preserved by maintaining viewing privileges of the user, as the user is able to continue working in a limited manner. Moreover, the company work setting is not subject to cyber-attacks based on behavior of the user, as the data amending privileges of the user are at least temporarily revoked.

Adjusting the role-based access control of the user may additionally and/or alternatively include reducing administrator privileges of the user in response to a determination that the risk levels exceed a first predetermined threshold and in response to a determination that second risk levels associated with previous behavior data of the user also exceed a first predetermined threshold. Reducing administrator privileges of the user in response to a determination that the risk levels exceed a first predetermined threshold and in response to a determination that second risk levels associated with previous behavior data of the user also exceed a first predetermined threshold addresses users having a history of high-risk behavior. Identifying and at least temporarily reducing administrator privileges of users having a history of high-risk behavior is useful because it addresses users that ongoingly behave in a way that causes data and/or infrastructure vulnerabilities.

A computer program product for adjusting role-based access control according to another approach includes a computer readable storage medium having program instructions embodied therewith. The program instructions are readable and/or executable by a computer to cause the computer to perform the foregoing method.

A system according to another approach includes a processor, and logic integrated with the processor, executable by the processor, or integrated with and executable by the processor. The logic is configured to perform the foregoing method.

Other aspects and approaches of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred aspects of systems, methods and computer program products for adjusting role-based access control of a user based on behavior data of the user.

In one general approach, a computer-implemented method includes receiving behavior data associated with a user's behavior on at least one device. The behavior data is based on one or more of an email account, a browser history, password usage and online behavior history. Risk levels associated with the behavior data are generated and role-based risk events are predicted based on the behavior data. The method further includes simulating the role-based risk events based on the risk levels, and adjusting role-based access control of the user based on results of the simulating.

In another general approach, a computer program product for adjusting role-based access control includes a computer readable storage medium having program instructions embodied therewith. The program instructions are readable and/or executable by a computer to cause the computer to perform the foregoing method.

In another general approach, a system includes a processor, and logic integrated with the processor, executable by the processor, or integrated with and executable by the processor. The logic is configured to perform the foregoing method.

Figure 1:
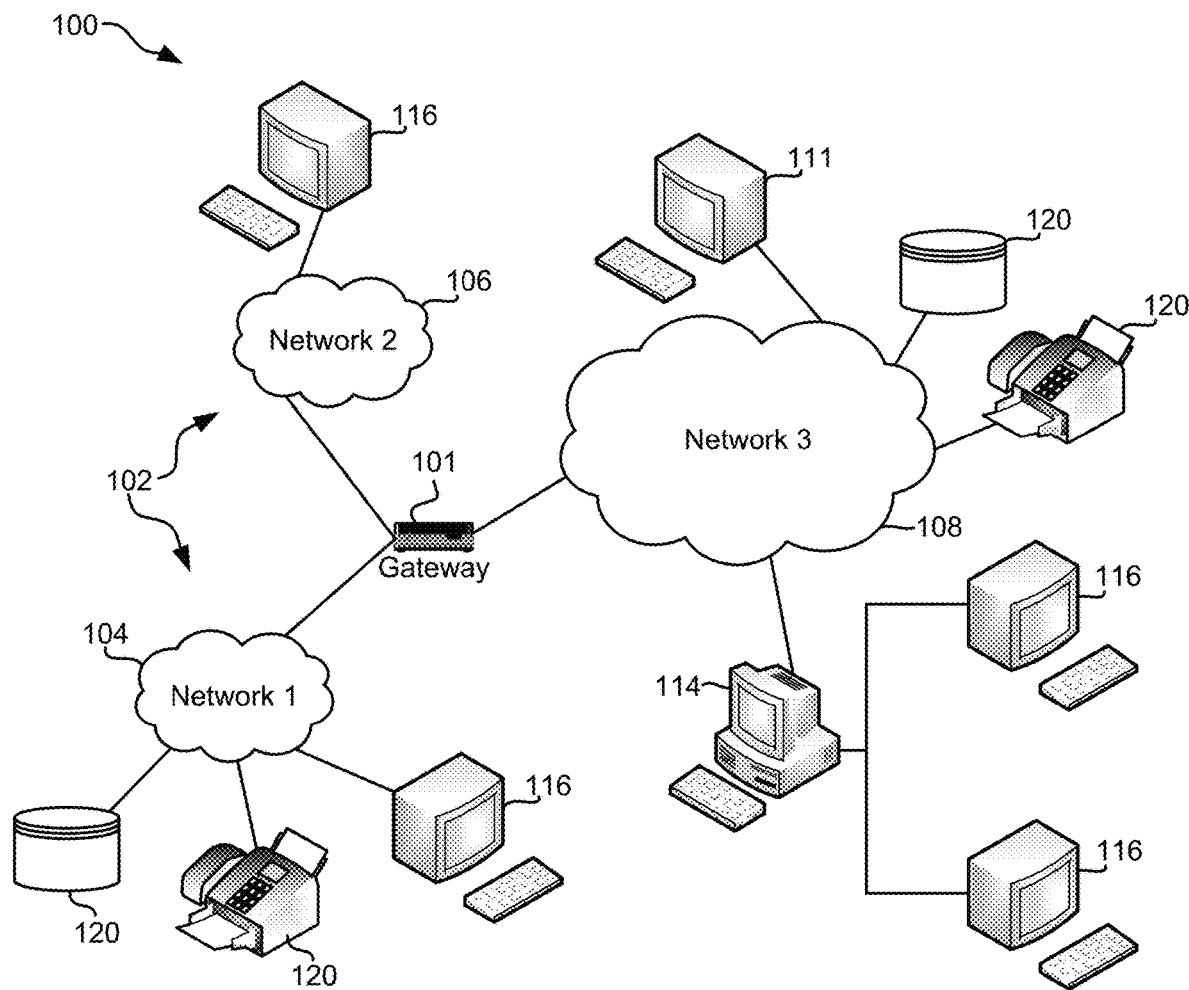
FIG. 1 is a diagram of a network architecture, in accordance with one approach.

FIG. 1 illustrates an architecture 100, in accordance with one approach. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one approach.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX® system which emulates an IBM® z/OS® environment (IBM and all IBM-based trademarks and logos are trademarks or registered trademarks of International Business Machines Corporation and/or its affiliates), a UNIX® system which virtually hosts a known operating system environment, an operating system which emulates an IBM® z/OS® environment, etc. This virtualization and/or emulation may be enhanced through the use of VMware® software, in some approaches.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
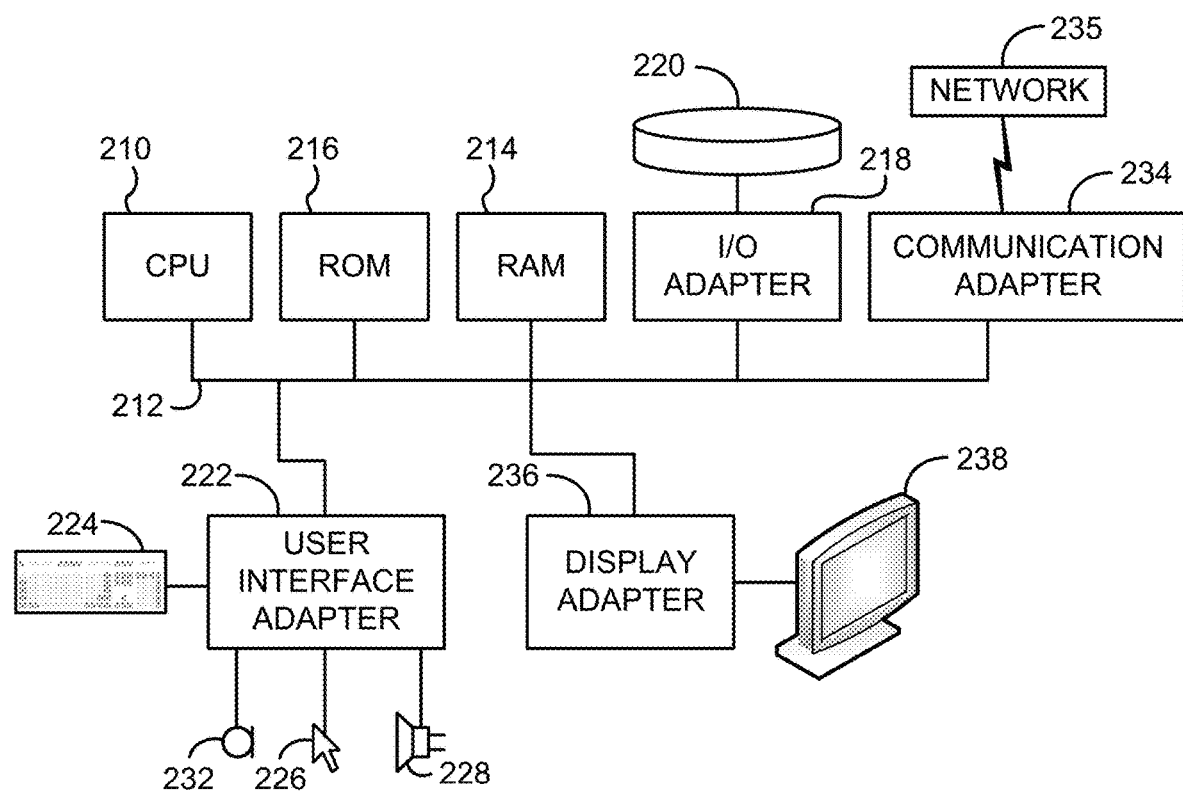
FIG. 2 is a diagram of a representative hardware environment that may be associated with the servers and/or clients of FIG. 1, in accordance with one approach.

FIG. 2 shows a representative hardware environment associated with a user device 116 and/or server 114 of FIG. 1, in accordance with one approach. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a macOS®, a UNIX® OS, etc. It will be appreciated that a preferred approach may also be implemented on platforms and operating systems other than those mentioned. A preferred approach may be written using eXtensible Markup Language (XML), C, and/or C++ language, or other programming languages, along with an object oriented programming methodology. Object oriented programming (OOP), which has become increasingly used to develop complex applications, may be used.

Figure 3:
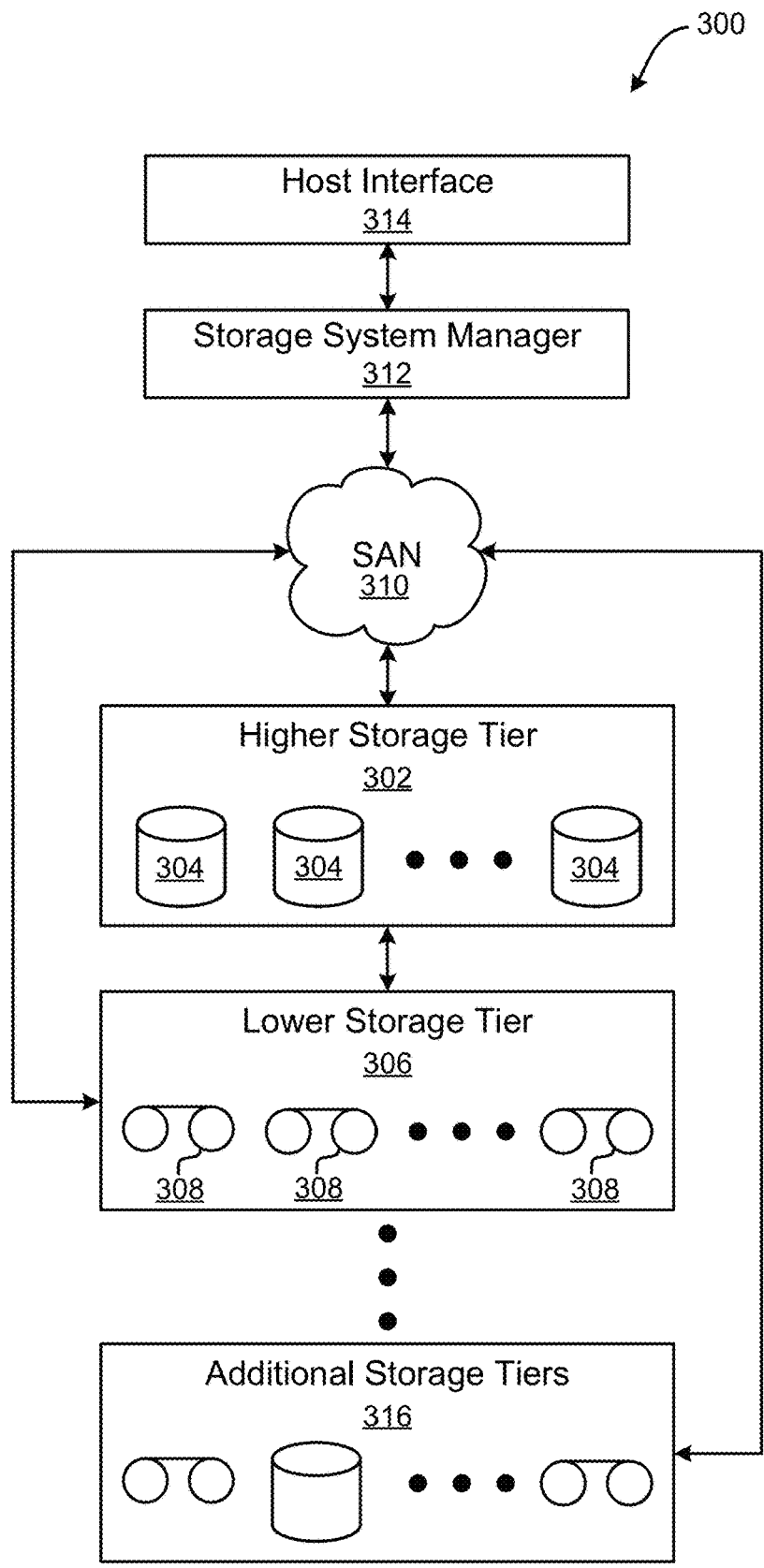
FIG. 3 is a diagram of a tiered data storage system, in accordance with one approach.

Now referring to FIG. 3, a storage system 300 is shown according to one approach. Note that some of the elements shown in FIG. 3 may be implemented as hardware and/or software, according to various approaches. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more approaches, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the approaches presented herein.

According to some approaches, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various approaches.

As mentioned elsewhere above, cybersecurity includes security hardware and protocols that aim to protect computer systems and networks from being compromised. Specifically, cybersecurity aims to protect the hardware, software, and/or electronic data of such computer systems and networks from being accessed, distributed, stolen, shared, etc., against the intentions of the lawful owner. Frequently, victims of cybersecurity breaches are not aware of the breach for an extended period of time, e.g., until an unauthorized use of information is detected and flagged by a monitoring service, until the victim of the cybersecurity breach realizes that they have been locked out of accessing their data and/or device, until the victim of the cybersecurity breach suspects that their data and/or device has been unintentionally modified or accessed, etc. In other cases, the victims of cybersecurity breaches may quickly become aware of a cybersecurity breach.

As cyber-attacks become more sophisticated over time and increasingly attack operational infrastructure, organizations are left vulnerable. Some users of such organizations may unintentionally contribute to the cause of a cybersecurity event. For example, common cyber-attack methods, such as malware, password attacks, phishing attacks, etc., rely on individuals that exhibit unsafe internet practices in order to gain access to a system. Even where organizations are diligent about reminding and training its members to conduct safe internet practices at all times, in many cases, the organization ends up the victim of a cybersecurity event because a member eventually, and perhaps quite innocently, exhibits unsafe internet practices. Commonly, despite receiving cybersecurity training, a user may exhibit unsafe internet practices based on the user not knowing that they are doing so. This is because some cyber-attack techniques are developed more quickly than companies are able to inform their members on new cyber-attack types.

Online internet practices are often not studied until a cyber-attack occurs, and only then is an investigation performed to determine how the event was able to occur. However, because the cyber-attack has already occurred, such a study is only able to, at most, attempt to mitigate the cyber-attack that has occurred and/or potentially prevent a similar attack from occurring again.

To mitigate the cyber-related issues described above, various approaches described herein leverage knowledge about user behavior on a system to determine whether the user behavior is risky, predict what data and/or infrastructures will be vulnerable in a cyber-attack based on the user behavior, and automate protections for the vulnerable data and/or infrastructures. More specifically, various approaches described herein enable a system to restrict role-based access for select users based on a predictive model. The model utilizes data about a user's online and/or in-application behavior in order to predict the likelihood of high-risk events, e.g., such as hijacked accounts, ransomware, etc. For example, assume that a system includes ten super-admin users, and data of the ten super-admin user's internet browsing history, password use, secured Wi-Fi use, etc., is evaluated. Based on this data, risk levels are generated for each user, which is in turn used to determine access permissions for each user. The role-based access of users with behavior data associated with a relatively high risk score is restricted to prevent sensitive data from being compromised by an attack. This restriction action may also trigger an evaluation of a user's behavior and propose course-corrective action(s) to reduce risk levels of the user's behavior thereafter. By assessing a user's behavior to determine a level of risk such behavior creates, and adjusting role-based access control of the user based on such behavior, cyber-attacks attempting to use that user's credentials, permissions, etc. are prevented from accessing sensitive information of the system outside the user's access permissions. This provides system-wide resiliency.

Figure 4:
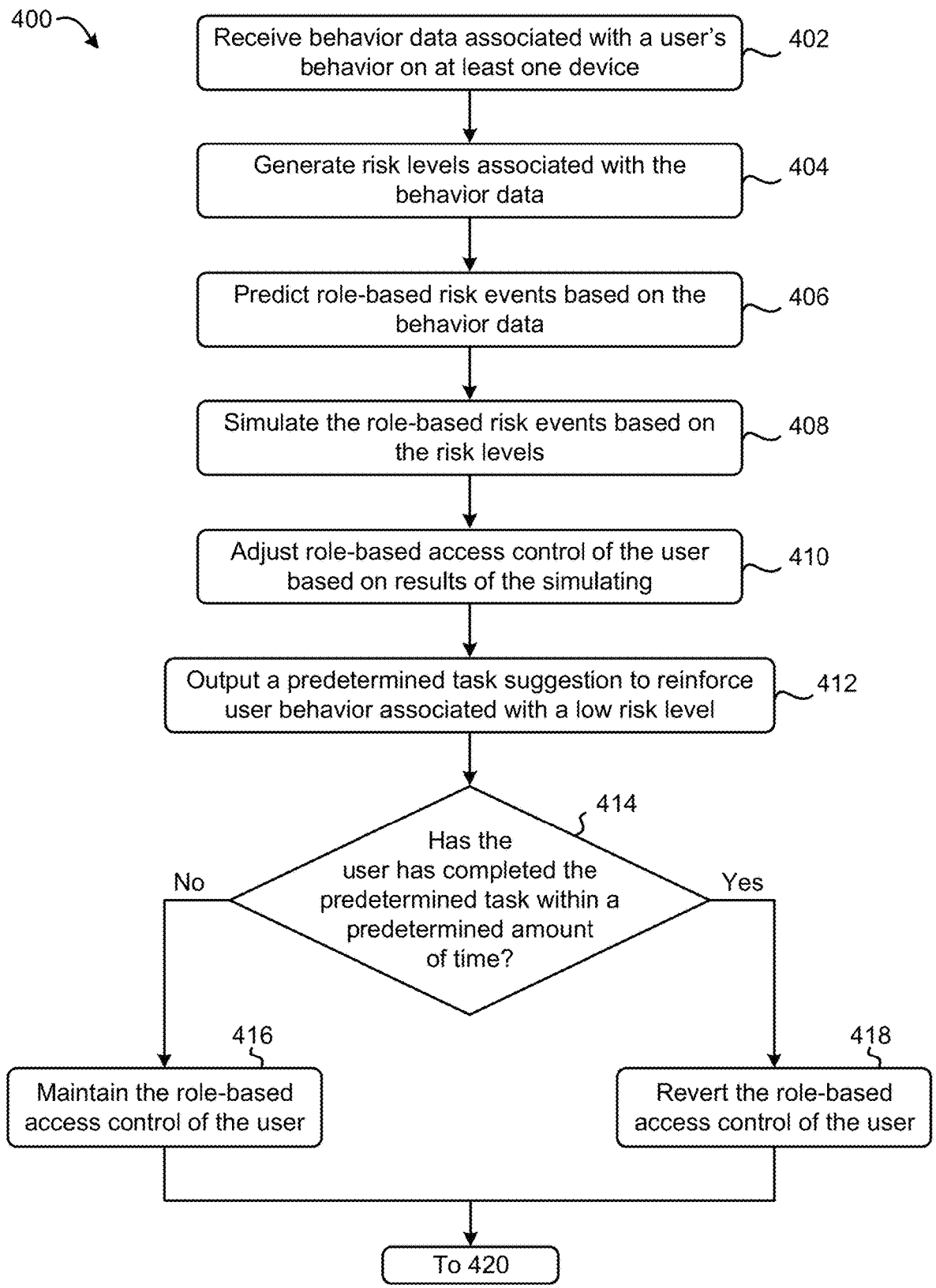
FIG. 4 is a flowchart of a method, in accordance with one approach.
Figure 4:
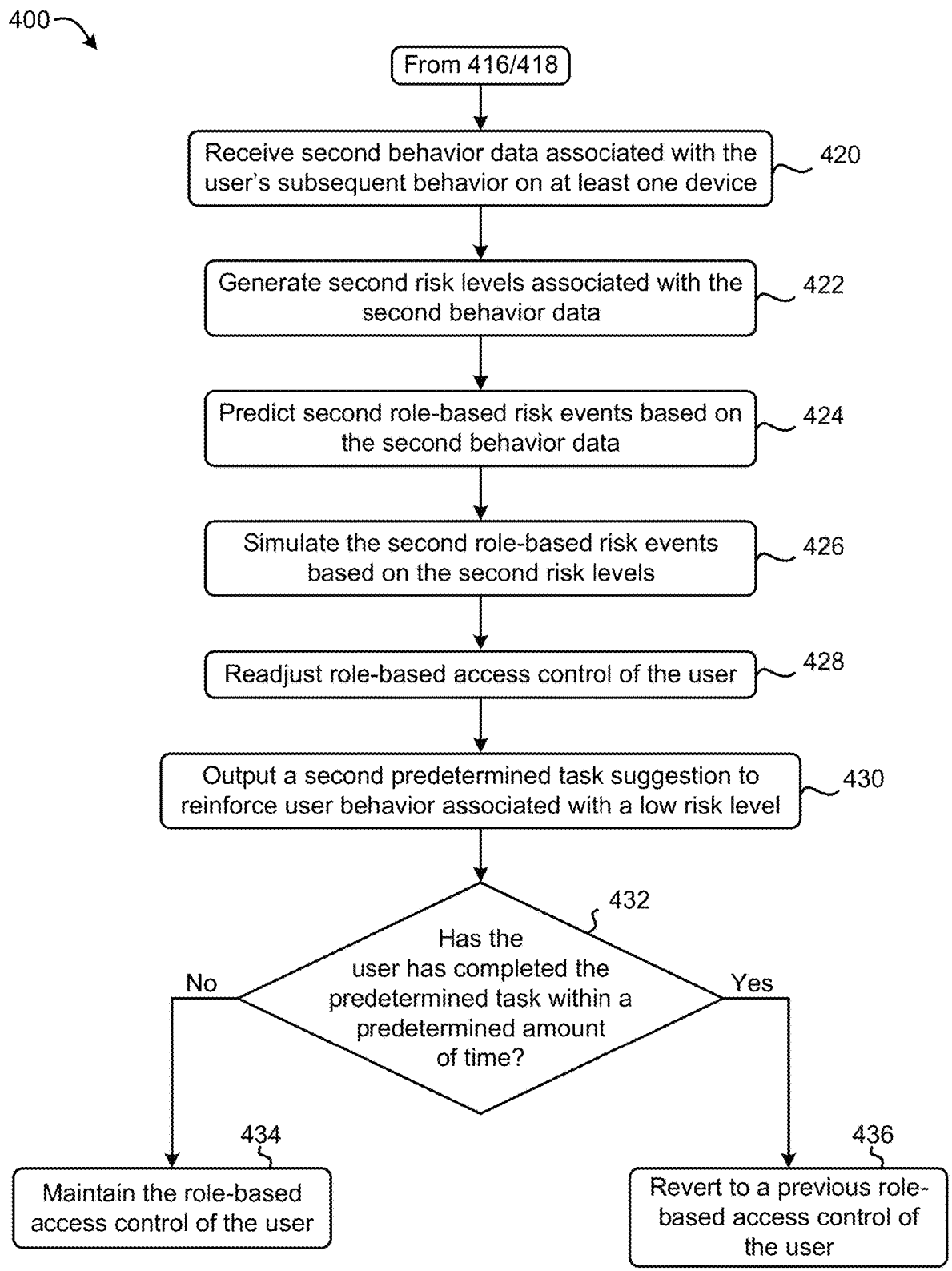

Now referring to FIG. 4, a flowchart of a method 400 is shown according to one approach. The method 400 may be performed in accordance with the present invention in any of the environments depicted in FIGS. 1-3 and 5-7, among others, in various approaches. Of course, more or fewer operations than those specifically described in FIG. 4 may be included in method 400, as would be understood by one of skill in the art upon reading the present descriptions.

Each of the steps of the method 400 may be performed by any suitable component of the operating environment. For example, in various approaches, the method 400 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

Operation 402 of method 400 includes receiving behavior data associated with a user's behavior on at least one device. In some approaches, the user's behavior data may be received by one or more processors from one or more devices having one or more applications that are used by the user. According to some more specific examples, the behavior data may be based on any combination of, e.g., an email account, a browser history, password usage, online behavior history, device screen time data, etc. The behavior data may in some approaches be collected using known techniques for collecting user behavior.

The type of behavior data that is collected may in one approach be dynamically set by company protocols. For example, the user may be a member of a company, and company protocols may define what actions of the user are to be monitored for generating the behavior data. However, it should be noted that users are preferably notified that their actions on devices are being monitored, and thereby, users are provided an opportunity to agree to such monitoring or object to such monitoring.

Risk levels associated with the behavior data is generated, e.g., see operation 404 of method 400.

Accordingly, the risk levels may, in some approaches, be generated based on evaluations performed on the received data, e.g., such as by evaluating the behavior data. Evaluation of the received behavior data may be based on predefined criteria, machine learning techniques, etc.

In preferred approaches, the risk levels are generated, at least in part, by classifying each individual user behavior to generate a score, e.g., on a scale from safe to unsafe. Any known classification technique may be used, such as but not limited to: Logistic Regression, Naïve Bayes, Stochastic Gradient Descent, K-Nearest Neighbor, Decision Tree, Random Forest, Support Vector Machine, etc. In general, classification techniques use a training set of data that is predefined or scored, e.g., the instances of data in the training set are known to be categorized as risky and non-risky. The classifier is trained using the training set, and then the user behavior data is scored by the trained classifier.

In one example, behavior data that is based on work email use may be evaluated to determine whether the user performs email actions that are potentially vulnerable to cyber-attacks, e.g., clicking on links of external emails, forwarding external emails that include links to other coworkers, including confidential information in unencrypted emails, etc. According to another approach, behavior data that is based on a browser history of the user may be evaluated to determine whether the user performs browsing actions that are potentially vulnerable to cyber-attacks, e.g., visiting unsecured web pages while at work, visiting sites that are prone to pop-ups, attempting to visit sites that are blocked by company-managed firewalls, etc. Behavior data that is based on a password usage of the user may additionally and/or alternatively be evaluated in some approaches to determine whether the user performs password-based actions that are potentially vulnerable to cyber-attacks, e.g., using a system password for other applications, using a system password for other non-work sites, storing passwords in an unsecured email folder, emailing passwords in an unencrypted format, etc. Behavior data that is based on behavior of the user may additionally and/or alternatively be evaluated in some approaches to determine whether the user behaves in a way that could cause cyber-attacks, e.g., the user is online at an non-typical time, the user is geographically located at an unsecured internet café, the user is geographically located at a competitor company headquarters, the user's computer is left unlocked while the user is determined to be at least a predetermined distance away from the computer, etc. Note that one or more of such evaluations and/or determination thereof may be performed using known techniques.

The risk levels created in operation 404 may be granular, e.g., a risk level may be determined for each instance of behavior; may be based on types of behavior, e.g., behaviors associated with email are given a risk level; and/or a risk level may be assigned to the behavior as a whole.

In one preferred approach, the risk levels may include a safe risk level and an unsafe risk level. However, one or more risk levels may optionally, additionally and/or alternatively be generated, e.g., a very safe risk level, a very unsafe risk level, a moderately safe risk level, a moderately unsafe risk level, etc. As noted above, risk levels may be generated for each individual user action of the behavior data. Each of the user actions may in one approach be classified on a scale from safe to unsafe depending on whether the user action is evaluated to be an action that is potentially vulnerable to cyber-attacks. For example, in one approach, a table that pre-classifies user actions as either safe or unsafe may be referenced. In such an approach, method 400 may include using the table to classify the user actions as safe or unsafe. In some other approaches, each individual user action of the behavior data may be assigned a safety score. In some of such approaches such an assignment may include, e.g., the user action being assigned a score from the table where the score has been pre-associated with the user action, the user action being assigned a safety score that is proportional to a number of times that the user action is determined to have occurred as indicated by the behavior data, the user action being assigned a safety score that is proportional to a frequency that the user action is determined to have occurred as indicated in the behavior data, etc.

For context, it should be noted that unsafe behavior may in some approaches be defined by careless user behavior, e.g., matching predefined criteria. In other approaches, unsafe behavior may be defined by user behavior that attempts to conform to safe cybersecurity practices, but is outdated based on advances in cyber-attacks capabilities.

Generating the risk levels associated with the behavior data may in some approaches include comparing the behavior data with at least some behaviors predetermined to be within the scope of at-risk user behavior related to cybersecurity. This comparison may be performed to determine which behaviors are within the scope of cybersecurity.

Some user behavior may be outside the scope of cybersecurity, but still be considered risky, e.g., such as behavior that is considered improper to be performed during work hours of a company that employs the user. Such behavior may also be assessed to determine whether it affects one or more of the risk levels. Accordingly, it may be determined whether the user's behavior includes at least some improper behavior that is outside the scope of the behaviors predetermined to be at-risk user behavior related to cybersecurity. A non-limiting list of such improper behavior may include, e.g., the user using their work issued computer for socializing purposes, the user using a work device to perform bank transactions, the user using a predetermined percentage of memory of the at least one device for storing non-work related data, the user playing games on the at least one device during work hours, the user using the at least one device to video chat with friends during work hours, the user using the at least one device to text chat with friends during work hours, the user using a predetermined percentage of processing resources of the at least one device for performing non-work related processes, etc. In response to a determination that the user's behavior includes at least some improper behavior, an action responsive thereto may be taken to discourage the improper behavior, e.g., such as outputting a warning to the user, outputting a notification of the improper behavior to a supervisor of the user, adjusting the role-based access control of the user, etc.

In some approaches, the user may have access to the generated risk levels that are based on their behavior. Allowing the user access to such scores may provide an educational component to method 400 in which the user may be forewarned upon participating in behavior that is potentially prone to enabling cybersecurity attacks. For example, method 400 may optionally include outputting a warning to the user that indicates that role-based access control of the user is not currently scheduled to be adjusted based on the behavior of the user, and encourages the user to be more careful on the at least one device. In such an example, the user may benefit from being warned about the user's behavior before role-based access control adjustments are made, because the user is provided an opportunity to be more careful before the user's work credentials are modified, e.g., based on an adjustment of the role-based access control. In contrast, in some other approaches, the user may not have access to the generated risk levels, as such access may otherwise allow the user to determine that at least some behavior is not subject to scrutiny. According to a more specific approach in which the user does not have access to the generated risk levels, the user may optionally still be notified if the user's role-based access control is ever adjusted, e.g., to prevent confusion in the event that the user is unable to access an application that the user commonly uses based on the adjustment of the role-based access control.

Role-based risk events are predicted based on the behavior data, e.g., see operation 406 of method 400. Role-based risk events may be potential events that are predetermined to be damaging, e.g., costly, embarrassing, time consuming to recover from, etc., for the user and/or a company that the user is associated with, in the event that one or more of such role-based risk events occur. Moreover, the role-based risk events may be determined to be of a type that can result from the user actions in the behavior data. For example, assume that the behavior data includes information that specifies that a user has opened a link of an external email that is received on an application of the user's work computer. Role-based risk events in such an example, may include the user's work computer and/or a server in communication with the user's work computer being accessed by an unauthorized person where the link of the external email was a phishing-based link. A non-limiting list of further examples of role-based risk events that may be predicted based on the behavior data include, e.g., user and/or application and/or server and/or network passwords being stolen by an unauthorized party as a result of the user using such passwords on a site that is potentially unsafe, confidential emails being distributed to unintended recipients, data breaches, identity breaches, data losses, data being intentionally modified by an unauthorized party, system lockout, computer viruses corrupting a company server, etc.

In a preferred approach, role-based risk events may be predicted using a known type of machine learning algorithm that is configured to predict events based on at least some user actions of behavior data and events resulting therefrom being input into the algorithm. Preferably, potential role-based risk events are identified based on the behavior data of a plurality of users. In another approach, role-based risk events may be predicted using a table that pre-associates at least some user actions with risk events. In some other approaches, role-based risk events may be predicted using one or more other known techniques for predicting role-based risk events based on recorded actions of a user, e.g., such as the user actions of the behavior data.

It should be realized that within a company setting, because role-based risk events may be based on the actions of multiple users, e.g., such as coworkers of the company, risk events may be predicted based on the behavior data of more than one user. For example, an external email may be received by a plurality of members of a company, and multiple members may open a cyber-attack-based link included therein. Accordingly, the actions of each of the multiple members may contribute to a damaging role-based risk event. Accordingly, although various approaches herein with respect to method 400 are described from the perspective of a single user, in some preferred approaches, the behavior data may be based on the actions of a plurality of users.

Operation 408 of method 400 includes simulating the role-based risk events based on the risk levels. One or more known techniques for simulating role-based risk events may be utilized. For context, simulation of the predicted role-based risk events may be performed in order to determine the potential extent of harm that may occur in the event that the user actions in fact cause the role-based risk events to occur. Determining the potential extent of harm that may occur as a result of the user actions in fact causing the role-based risk events to occur may be a useful step for both determining how to recover from such a role-based risk event, as well as how to prevent the user from thereafter causing another role-based risk event. Moreover, the simulations may include performing testing to determine damage that may result if user behavior were to continue to occur without mitigating role-based access control adjustments being performed. For example, assume that multiple members have clicked on a link in an email from an external source, and as a result, the passwords and usernames of at least some of the users are compromised. The breach of the passwords and the usernames of the multiple users may be identified as a risk event, and simulations may be performed that determine how much damage an external party obtaining the passwords and usernames of the multiple users may cause. For example, a first performed simulation may consider the external party having such access for a day without the risk event being recognized and thereby the passwords being changed. Moreover, a second performed simulation may consider the external party having such access for multiple days without the risk event being recognized and thereby the passwords being changed. Accordingly, different degrees of risk that may occur are determined, which may be used for determining actions to take to mitigate the predicted role-based risks events from occurring.

In one preferred approach, the role-based access control of the user are at least temporarily adjusted, e.g., see operation 410. Adjustments of the role-based access control of the user may prevent the user from continuing and/or initiating user behavior that is potentially capable of causing the predicted role-based risk events. In some approaches, the user may be prevented from continuing and/or initiating user behavior that is potentially capable of causing the predicted role-based risk events by restricting the user from accessing data and/or an infrastructure that are potentially vulnerable to the predicted role-based risk events. Accordingly, in one preferred approach, method 400 optionally includes determining, based on the results of the simulating, data and/or an infrastructure that are potentially vulnerable to the predicted role-based risk events. More specifically, portions of a company's information architecture that are sensitive to attack based on the user behavior may be identified in such a determination. Data and/or infrastructure may, depending on the approach, be determined to be potentially vulnerable to a predicted role-based risk event based on, e.g., the data and/or infrastructure including losses in the results of the simulating, the data and/or infrastructure being accessed during actions that the user behavior is based on, access credentials of the data and/or infrastructure becoming potentially accessible to one or more unauthorized devices, using one or more known techniques for determining whether data and/or an infrastructure is potentially vulnerable to a predicted role-based risk event, etc.

Adjusting the role-based access control of the user may in some approaches include adding a security layer to the data and/or to the infrastructure determined to be potentially vulnerable to the predicted role-based risk events. The added security layer may include any one or more types of security, e.g., two factor identification, three factor identification, facial recognition, fingerprint recognition, security questions, known types of security criteria, etc. The security layer may in some approaches be added to the data and/or to the infrastructure determined to be potentially vulnerable to the predicted role-based risk events in response to a determination that the risk levels exceed a predetermined threshold. The predetermined threshold may be set by and/or adjusted by any entity, e.g., a manager of the user, a company that the user works for, a known type of algorithm that accesses a table to set the threshold where the table includes thresholds that are correlated to user actions of behavior data, etc. It should be noted that the adjustment of the role-based access control of the user may in some approaches adjust the role-based access control of other users. For example, in one approach, assuming that the user is a member of a company, the adjustment of the role-based access control of the user may result in other members of the company having similar credentials and/or a similar role-based access control also being subjected to the added security layer when the other members request to access the data and/or the infrastructure with the added security layer.

Adjusting the role-based access control of the user may additionally and/or alternatively include reducing administrator privileges of the user. Reducing administrator privileges of the user may prevent the user from thereafter causing other role-based risk events, e.g., such as role-based risk events that were not predicted in operation 406, because the user, as a result of the adjustment, would no longer have access to at least some data and/or infrastructure. Moreover, role-based risk events may in some approaches be prevented based on the user having reduced administrator privileges because the actions of the user may thereafter be subject to more scrutiny, e.g., where the user is adjusted from an administrative capacity to a supervised capacity as a result of the reduced administrator privileges. According to various approaches, reducing administrator privileges of the user may include, e.g., maintaining data viewing privileges of the user and revoking data amending privileges of the user, revoking access privileges of the user to data and/or infrastructure having a predetermined clearance level, requiring that the user be supervised by another user while accessing data and/or infrastructure having a predetermined clearance level, requiring that the user submit a request to access data and/or infrastructure having a predetermined clearance level and requiring that the request be approved before the user is allowed to perform the access, using known techniques for reducing administrator privileges of a user, etc.

The administrator privileges may, in some approaches, be reduced in response to a determination that the risk levels exceed a predetermined threshold. The predetermined threshold may be set and/or adjusted by, e.g., a manager of the user, a company that the user works for, a known type of algorithm that accesses a table to set the threshold where the table correlates thresholds to user actions of behavior data, etc. According to a more specific approach, performing such an adjustment may be conditionally based on the results of the results of the simulating. For example, in some approaches, the role-based access control of the user may be at least temporarily adjusted based on a predetermined proportion, e.g., at least twenty-five percent, at least sixty-five percent, at least ninety percent, etc., of the simulations resulting in data impact events on a system that the user has access to. In another approach, the administrator privileges may additionally and/or alternatively be reduced in response to a determination that the user behavior can be characterized as sudden high-risk-behavior. In such an approach, the user behavior may be determined to be sudden high-risk-behavior based on previous behavior data of the user, e.g., such as previous behavior data within a predetermined recent period, not including risk levels that are greater than or equal to the risk levels associated with the received behavior data. It should be noted that sudden high-risk behavior may be indicative of the user's information having been improperly appropriated and the user behavior therefore originating from a source posing as the user. Accordingly, where sudden high-risk behavior is suspected, adjustment of the role-based access control of the user may in some approaches include completely revoking all privileges of the user, at least until it is determined that the user's information has not been improperly acquired and/or misused.

In some other approaches, the administrator privileges may additionally and/or alternatively be reduced in response to a determination that the user has a history of performing high-risk-behavior and has performed high-risk-behavior again. For example, a conclusion that the user has a history of performing high-risk-behavior and has performed high-risk-behavior again may be based on a determination that the risk levels associated with the received behavior data exceed a predetermined threshold and in response to a determination that risk levels associated with previous behavior data of the user, e.g., such as previous behavior data within a predetermined recent period, also exceed the predetermined threshold. In another approach, a conclusion that the user has a history of performing high-risk-behavior and has performed high-risk-behavior again may be based on a determination that an average of the risk levels of previous behavior data of the user, e.g., such as previous behavior data within a predetermined recent period, and the risk levels associated with the received behavior data exceed a predetermined threshold.

Although in some approaches the user's administrator privileges may be reduced indefinitely, depending on the approach, at some point a determination may be made as to whether the user's administrator privileges should be adjusted again. For example, the role-based access control of the user may in some approaches be temporarily adjusted, e.g., for a predetermined period of time, until an investigation is performed on the user's behavior, until it is determined whether an unauthorized device has gained access to data and/or an infrastructure based on the behavior of the user, etc. The role-based access control of the user may in some approaches be readjusted in response to a determination that the user has taken steps to reinforce user behavior associated with a low risk level. For example, operation 412 includes outputting a predetermined task suggestion to reinforce user behavior associated with a low risk level. The predetermined task suggestion may be output to, e.g., a display of the at least one device, to the user's email inbox, to the user's phone, to a schedule of a team that the user is a member of at a company, etc. According to various approaches, the predetermined task suggestion may suggest, e.g., participating in a predetermined regimen of cybersecurity training, participating in a quiz regarding cybersecurity, reading a diagnostic log that details the user's unsafe behavior and recommends how to avoid such actions in the future, participating with a learning session with a cybersecurity compliance officer, etc.

A determination is made as to whether the user has completed the predetermined task within a predetermined amount of time, e.g., see decision 414. Such a determination may be performed using known techniques for determining whether a user has performed a predetermined task. In response to a determination that the user has completed the predetermined task within the predetermined amount of time, e.g., as illustrated by the "Yes" logical path of decision 414, the role-based access control of the user may optionally be reverted back to a previous state, e.g., see operation 418 of method 400. The previous state that the role-based access control of the user is reverted to may be, e.g., a state of the role-based access control that existed immediately prior to the adjusting, a state in which only a predetermined portion of the access credentials that the user had prior to the adjusting of the role-based access control of the user are reinstated, a state in which more access credentials than the user had prior to the adjusting of the role-based access control of the user are instated, a predetermined state of access credentials previously held by the user, etc. In contrast, in response to a determination that the user has not completed the predetermined task within the predetermined amount of time, e.g., as illustrated by the "No" logical path of decision 414, the role-based access control of the user may optionally be maintained, e.g., see operation 416. In another approach, in response to a determination that the user has not completed the predetermined task within the predetermined amount of time, the role-based access control of the user may optionally be further adjusted, e.g., reduced an additional predetermined extent based on a presumption that the user has not attempted to develop behavior associated with a low risk level.

The benefits of various approaches described herein include cyber-resiliency of systems that are impacted by user behavior. Cyber-resiliency is a system's ability to protect itself before damaging things occur to the system. A common root cause of cyber-attacks are users being successfully targeted. Accordingly, various approaches described herein reduce the potential for and/or prevent risk events from occurring by identifying user behaviors that cause data and/or infrastructure vulnerabilities, and adjusting role-based access controls to discourage and/or prevent the users from behaving in such a way thereafter. It should be noted that the techniques of such approaches actively mitigate risky user behavior that is predicted to be capable of causing risk events, during and/or soon after the user behavior occurs. Accordingly, systems such as computers and/or servers that would otherwise be compromised if risk-events did in fact occur operate more efficiently as a result of various approaches described herein, because they are not subjected to damaging cyber-attacks. This is contrary to conventional cybersecurity measures which merely respond to a cybersecurity event that has occurred. Various approaches described herein furthermore implement reinforcement training to instill user behavior associated with a low risk level. This is also contrary to conventional cybersecurity training protocols which merely request that a user watch cybersecurity training slides and/or listen to cybersecurity training lectures, which often fail to retain the attention and interest of the user beyond a nominal period of time. In sharp contrast, the techniques of various approaches described herein implement a user specific training approach to cybersecurity training, in which users have their role-based access control adjusted according to the risk levels associated with their behavior. This is particularly important because in a multi-user environment such as a company, different users adjust and conform to changing cybersecurity protocols at different rates.

As mentioned elsewhere herein, it should be realized that within an environment setting such as a company, role-based risk events may be based on the actions of multiple users, e.g., such as coworkers of the company. Accordingly, in some approaches, risk events may be predicted based on the behavior data of more than one user. Furthermore, in some approaches, the adjustment of the role-based access control may be based on risk and privacy tolerances that are specific to particular users. For context, risk and privacy tolerances may be used to determine how much to adjust a user's role-based access control based on the risk levels associated with the user's behavior data. For example, the adjustment of the role-based access control of the user may be based on an assigned first risk and privacy tolerance that is unique to the user, e.g., configured for the user, based on the user's prior user behavior, based on the risk levels associated with the user's prior behavior data, etc. According to a more specific approach, the relative strictness of a user's risk and privacy tolerance may be proportional to the number of times that a user engages in behavior that is associated with high risk levels. In such an approach, administrator privileges of the user may be reduced by a greater amount each time that the received behavior data that is associated with risk levels that are greater than a predetermined threshold. The risk and privacy tolerances may be user specific, and therefore method 400 may include assigning, to a second user of the at least one device, a risk and privacy tolerance that is different than the risk and privacy tolerance assigned to the user. Assigning risk and privacy tolerances to a user a according at least in part to the user's behavior is beneficial because it eliminates events in which users have their role-based access control adjusted for risky behavior that they did not perform. For example, as a result of a first user and a second user each being assigned their own risk and privacy tolerances, where the first user has behavior data that is associated with relatively low risk levels and has a similar degree of access control to a second user having behavior that is associated with relatively high risk levels, the first user's role-based access control is not adjusted as a result of the behavior of the second user.

The adjustment of the role-based access control may additionally and/or alternatively be based on risk and privacy tolerances that are specific to applications used by the users, e.g., such as applications of the at least one device. Said another way, and as will be further described in operations 420-436 of method 400, the risk and privacy tolerances of a user may be application specific in some approaches. For example, in method 400 the user's behavior may have occurred on an application, e.g., a first application that is configured on the at least one device. In such an example, the adjustment of the role-based access control of the user may be based on an assigned first risk and privacy tolerance that is specific to the first application. Second behavior data associated with the user's subsequent behavior on at least one device is optionally received, e.g., see operation 420. The at least one device on which the user's subsequent behavior is performed may in some approaches be the same device(s) as the device(s) on which the behavior data of operation 402 is performed. In some other approaches, the at least one device on which the user's subsequent behavior is performed may be different device(s) than the device(s) that the behavior data of operation 402 is performed on. In one illustrative approach, the user's subsequent behavior may occur on a second application, e.g., a second application that is configured on the at least one device.

Operation 422 includes generating second risk levels associated with the second behavior data. The second risk levels associated with the second behavior data may be generated using similar techniques to the techniques described elsewhere herein for generating risk levels associated with received behavior data, e.g., see operation 404.

Second role-based risk events is optionally predicted based on the second behavior data, e.g., see operation 424. The second role-based risk events are optionally simulated based on the second risk levels, e.g., see operation 426. Note that the prediction and simulation in operations 424-426 may be performed using similar techniques as the techniques described elsewhere herein for predicting and simulating risk-based events, e.g., see operations 4046-408.

The user's role-based access control is optionally readjusted, e.g., see operation 428. In one approach, the readjustment of the user's role-based access control may be based on the simulation of the second role-based risk events based on the second risk levels. For example, assuming that data and/or an infrastructure that are potentially vulnerable to the predicted second role-based risk events are determined based on results of the simulation of the second role-based risk events, the role-based access control of the user may be readjusted, e.g., further adjusted, to account for such determined potential vulnerabilities. Readjusting the role-based access control of the user may in some approaches include adding a security layer to the data and/or adding a security layer to the infrastructure and/or reducing administrator privileges of the user. Note that in some approaches, where the user's subsequent behavior occurs on the second application, the readjusting of the role-based access control of the user may be based on an assigned second risk and privacy tolerance that is specific to the second application. Accordingly, in one approach, a degree of the readjustment of the role-based access control may be different than a degree of the previous adjustment of the role-based access control, e.g., different than the degree of adjustment of operation 410. Such relative degrees of adjusting the role-based access control may be based on the second risk and privacy tolerance having a lower threshold than a threshold of the first risk and privacy. According to an illustrative example, based on the second application being configured to enable access to highly confidential information of a company and the first application being configured to enable access to only nominally confidential information of the company, the second risk and privacy tolerance may be set to have a lower threshold than a threshold of the first risk and privacy. As a result, for the same type of user behavior, the resulting adjustments of the user's role-based access control based on the second risk and privacy tolerance may be more restrictive than the resulting adjustments of the role-based access control based on the first risk and privacy tolerance. In another approach, the degree of the readjustment of the role-based access control may be equal to a degree of the previous adjustment of the role-based access control. Note that the risk and privacy tolerances may be adjusted at any time, e.g., based changes to an organization's preference, based on role-based access control levels, based on the user being promoted at a company that sets the risk and privacy tolerances, based on the user being demoted at a company that sets the risk and privacy tolerances, etc.

A predetermined task suggestion is optionally output to reinforce user behavior associated with a low risk level, e.g., see operation 430. The predetermined task suggestion may be output to, e.g., a display of the at least one device, to the user's e-mail inbox, to the user's phone, to a schedule of a team that the user is a member of at a company, etc. According to various approaches, the predetermined task suggestion may suggest, e.g., participating in a predetermined regimen of cybersecurity training, participating in a quiz regarding cybersecurity, reading a diagnostic log that details the user's unsafe behavior and recommends how to avoid such actions in the future, participating with a learning session with a cybersecurity compliance officer, etc.

A determination is made as to whether the user has completed the predetermined task within a predetermined amount of time, e.g., see decision 432. Such a determination may be performed using known techniques for determining whether a user has performed a predetermined task. In response to a determination that the user has completed the predetermined task within the predetermined amount of time, e.g., as illustrated by the "Yes" logical path of decision 432, the role-based access control of the user may optionally be reverted back to a previous state, e.g., see operation 436. The previous state that the role-based access control of the user is reverted to may be, e.g., a state of the role-based access control that existed immediately prior to the readjusting, a state of the role-based access control that existed immediately prior to the adjusting of operation 410, a state in which only a predetermined portion of the access credentials that the user had prior to the adjusting of the role-based access control of the user are reinstated, a state in which more access credentials than the user had prior to the adjusting of the role-based access control of the user are reinstated, a predetermined state of access credentials previously held by the user, etc. In contrast, in response to a determination that the user has not completed the predetermined task within the predetermined amount of time, e.g., as illustrated by the "No" logical path of decision 432, the role-based access control of the user may optionally be maintained, e.g., see operation 434. In another approach, in response to a determination that the user has not completed the predetermined task within the predetermined amount of time, the role-based access control of the user may optionally be further adjusted, e.g., reduced an additional predetermined extent based on a presumption that the user has not attempted to develop behavior associated with a low risk level.

Figure 5:
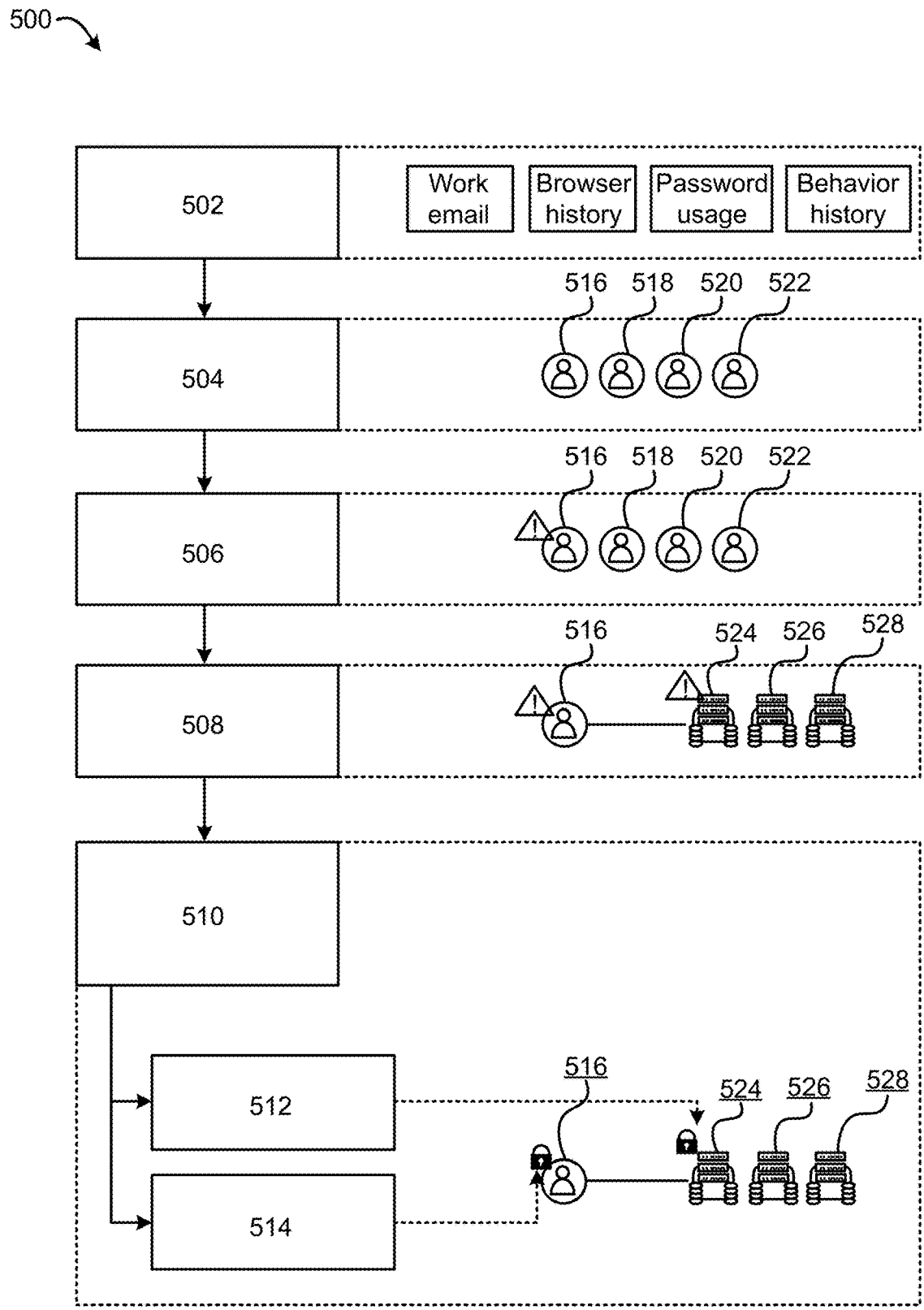
FIG. 5 is a flowchart of a method, in accordance with one approach.

Now referring to FIG. 5, a flowchart of a method 500 is shown according to one approach. The method 500 may be performed in accordance with the present invention in any of the environments depicted in FIGS. 1-4 and 6-7, among others, in various approaches. Of course, more or fewer operations than those specifically described in FIG. 5 may be included in method 500, as would be understood by one of skill in the art upon reading the present descriptions.

Each of the steps of the method 500 may be performed by any suitable component of the operating environment. For example, in various approaches, the method 500 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

Operation 502 of the method 500 includes collecting behavior data on individual users, e.g., such as work email behavior data, browser history behavior data, password usage behavior data, behavior history, etc. The behavior data may be associated with the individual user's behavior on at least one device and/or at least one application of the at least one device. Risk levels associated with the behavior data may be generated. For example, in one approach, the method 500 may include classifying each individual user behavior, e.g., see users 516-522, based on the collected behavior data, e.g., see operation 504. In one approach, the risk levels may range from safe to unsafe.

Role-based risk events may be predicted based on the behavior data. For example, the method 500 may include identifying potential risk events based on all of the collected user data, e.g., see operation 506. In FIG. 5, a potential risk event may be detected based on the behavior data of the user 516, e.g., see "!" of the user 516.

The predicted role-based risk events may be simulated based on the risk levels, e.g., see operation 508. In one approach, data and/or an infrastructure that are potentially vulnerable to the predicted role-based risk events may be determined based on the results of the simulating, e.g., see infrastructures 524-528. For example, in FIG. 5, the infrastructure 524 is determined to be potentially vulnerable to the predicted role-based risk event that is based on the behavior data of the user 516.

System optimizations and role-based access control changes of one or more of the users 516-522 may be identified and automated for relatively high risk and relatively impactful simulated risk events, e.g., see operation 510. These optimizations and role-based access control changes may be based on the results of the simulating. For example, in one approach, adjusting the role-based access control of at least one of the users may include temporarily reducing administrator privileges of the user 516, e.g., see operation 514. According to a more specific approach, the administrator privileges of the user 516 may be reduced in response to a determination that the user 516 has a history of relatively high-risk behavior. Adjusting the role-based access control of the user within the context of the system that the user behavior was performed within, e.g., on the at least one device of the system, may include adding a security layer to the data and/or to the infrastructure that are potentially vulnerable to the predicted role-based risk events. For example, operation 512 includes adding a layer of security to relatively highly sensitive data and/or infrastructure that multiple users having high-risk behavior have access to.

For context, the system that includes the infrastructure 524-528 may be any type of system such as a company that can be subject to cyber-attack events based on the behavior of members of the company. For example, in FIG. 5, the system described in the operations of method 500 may be a large multinational bank and the users 516-522 may be members employed by the bank. For purposes of an example, it may be assumed that part of the bank, e.g., infrastructure 524, was recently affected by a ransomware attack. Moreover, it may be assumed that the bank's vulnerability to the ransomware attack was introduced to the bank's infrastructure 524 based on the irresponsible use of company email by user 516, who may be assumed to be a security officer at the bank. It may be further assumed that the bank is able to recover from the ransomware attack using air-gapped backups on tape. However, it should be noted that, despite recovering, the bank is still subject to the vulnerability that the ransomware attack exploited. The techniques of method 500 may be implemented by the bank in order to prevent further similar attacks. In deploying such techniques, the bank may then be able to monitor the behavior of the users 516-522. Using the many simulations, the techniques of various approaches herein enable infrastructure permissions of the bank to be modified in response to a high probability vulnerability being detected, e.g., such as downgrading a specific user's authority, temporarily restricting a user's access to predetermined and/or vulnerable infrastructure, etc. Accordingly, the techniques of various approaches described herein enable cyber-resiliency. This is because systems such as computers and/or servers of the bank that would otherwise be compromised if risk-events did in fact occur operate more efficiently as a result of various approaches described herein, because they are not subjected to damaging cyber-attacks.

For purposes of another example, in FIG. 5, the system that includes the infrastructure 524-528 may be a government agency and the users 516-522 may be members of the government agency. A security officer, who primarily focuses on infrastructure cyber security, that works at the government agency may deploy the techniques of various approaches described herein to the government agency. As a result of such a deployment, it may be determined that one of the members of the government agency, e.g., user 516, is frequently using similar or duplicate passwords for multiple systems. This may violate policies and protocols set by the government agency. The member permissions and access may be analyzed using techniques of various approaches described herein, and based on the results of performed simulations, it may be determined what infrastructure is vulnerable to being compromised if credentials of the user 516 are improperly appropriated. The user's 516 role-based access control may be downgraded based on the results of the simulating, and further actions may be scheduled to ensure that subsequent behavior of the user 516 is not associated with a high risk level, e.g., such as arranging a meeting with the user 516 and a manager of the user 516 to train user 516 on proper, secure password management. In response to a determination that user 516 has finished the training, such as within a predetermined amount of time, role access of the user 516 may be restored. The techniques of various approaches described herein enable the government agency to become resilient to cyber-attacks. This is because as opposed to merely responding to cyber-attack events, using the techniques of various approaches described herein, user behavior that is associated with a high risk level is identified and corrected.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
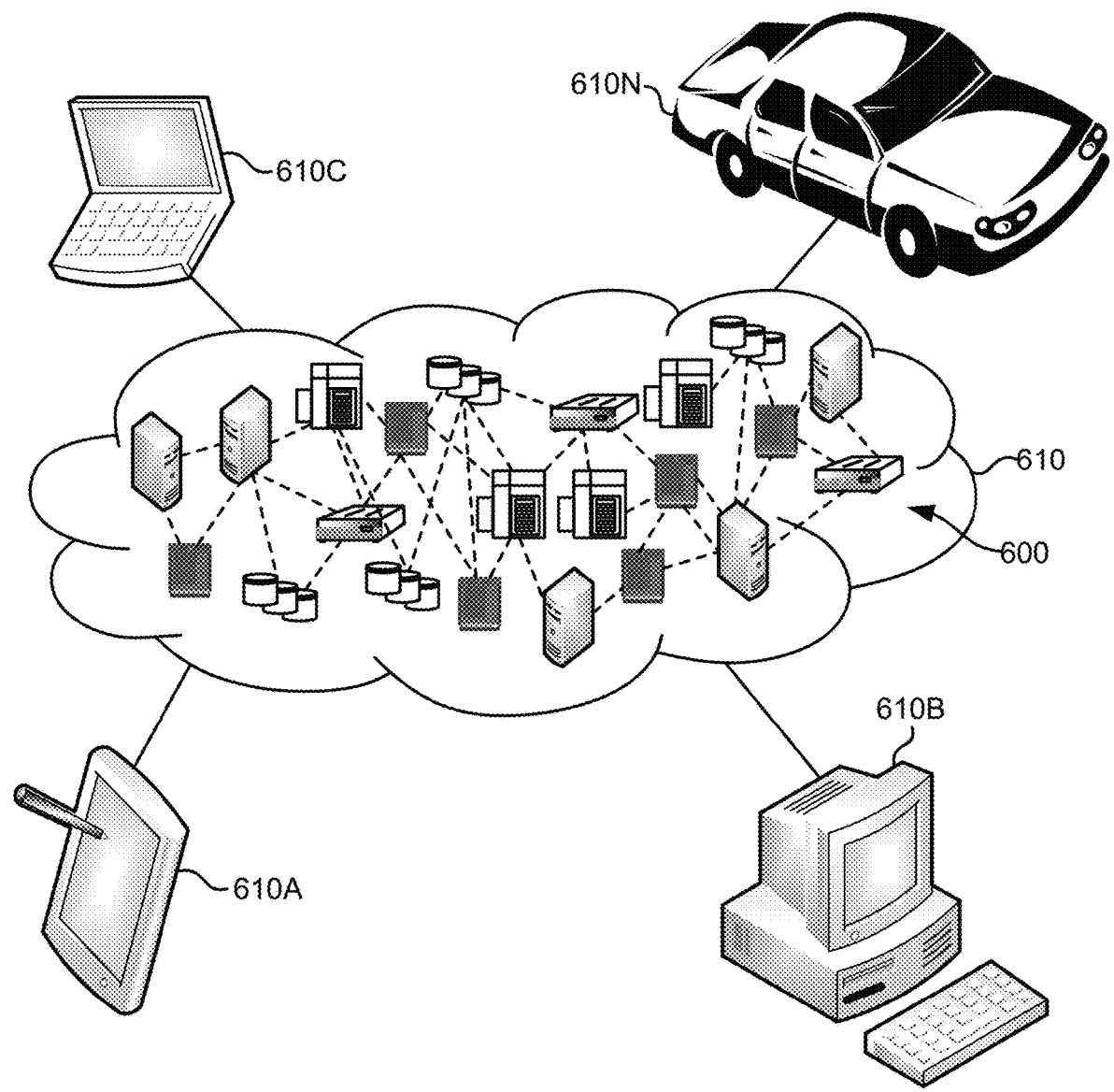
FIG. 6 is a diagram depicting a cloud computing environment, in accordance with one aspect of the present invention.

Referring now to FIG. 6, illustrative cloud computing environment 610 is depicted. As shown, cloud computing environment 610 includes one or more cloud computing nodes 600 with which local computing devices used by cloud consumers, such as, for example, personal digital assistant (PDA) or cellular telephone 610A, desktop computer 610B, laptop computer 610C, and/or automobile computer system 610N may communicate. Nodes 600 may communicate with one another. They may be grouped (not shown) physically or virtually, in one or more networks, such as Private, Community, Public, or Hybrid clouds as described hereinabove, or a combination thereof. This allows cloud computing environment 610 to offer infrastructure, platforms and/or software as services for which a cloud consumer does not need to maintain resources on a local computing device. It is understood that the types of computing devices 610A-N shown in FIG. 6 are intended to be illustrative only and that computing nodes 600 and cloud computing environment 610 can communicate with any type of computerized device over any type of network and/or network addressable connection (e.g., using a web browser).

Figure 7:
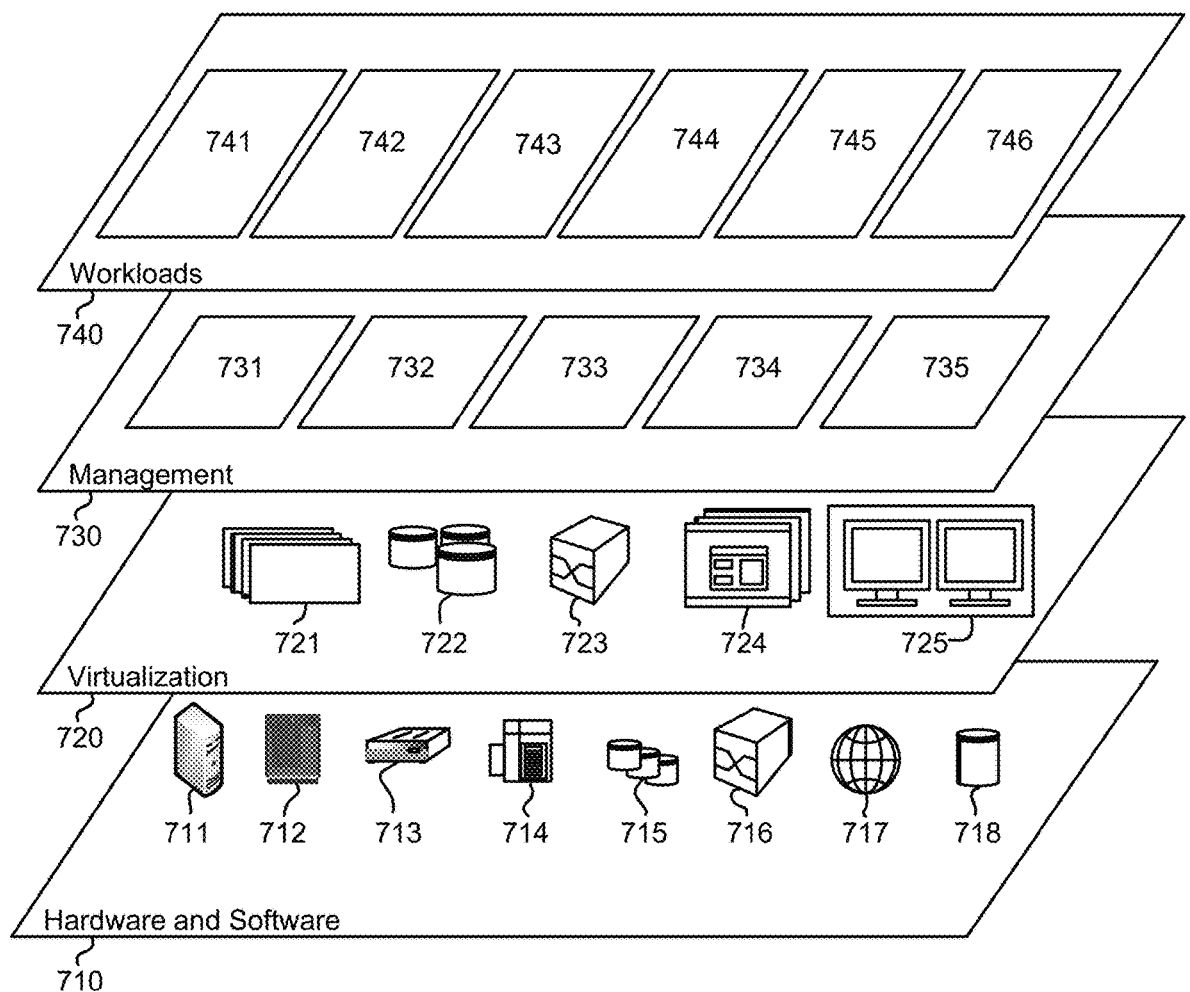
FIG. 7 depicts abstraction model layers, in accordance with one aspect of the present invention.

Referring now to FIG. 7, a set of functional abstraction layers provided by cloud computing environment 610 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 710 includes hardware and software components. Examples of hardware components include: mainframes 711; RISC (Reduced Instruction Set Computer) architecture based servers 712; servers 713; blade servers 714; storage devices 715; and networks and networking components 716. In some embodiments, software components include network application server software 717 and database software 718.

Virtualization layer 720 provides an abstraction layer from which the following examples of virtual entities may be provided: virtual servers 721; virtual storage 722; virtual networks 723, including virtual private networks; virtual applications and operating systems 724; and virtual clients 725.

In one example, management layer 730 may provide the functions described below. Resource provisioning 731 provides dynamic procurement of computing resources and other resources that are utilized to perform tasks within the cloud computing environment. Metering and Pricing 732 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 733 provides access to the cloud computing environment for consumers and system administrators. Service level management 734 provides cloud computing resource allocation and management such that required service levels are met. Service Level Agreement (SLA) planning and fulfillment 735 provide pre-arrangement for, and procurement of, cloud computing resources for which a future requirement is anticipated in accordance with an SLA.

Workloads layer 740 provides examples of functionality for which the cloud computing environment may be utilized. Examples of workloads and functions which may be provided from this layer include: mapping and navigation 741; software development and lifecycle management 742; virtual classroom education delivery 743; data analytics processing 744; transaction processing 745; and adjusting role-based access control of the user 746 according to any of the approaches described herein. The role of adjusting role-based access control of the user is typically managed by the management layer 730 and/or the hardware and software layer 710.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   receiving behavior data associated with a user's behavior on a first application on at least one device;
   generating, for each instance of behavior in the behavior data, a risk level associated with the behavior data;
   predicting role-based risk events based on the behavior data;

simulating the role-based risk events based on the risk levels; and adjusting role-based access control of the user based on results of the simulating and a strictness of a first risk and privacy tolerance that is assigned to the user and specific to the user's behavior on the first application, wherein the adjustment includes maintaining data viewing privileges of the user and revoking data amending privileges of the user, wherein the strictness of the first risk and privacy tolerance is proportional to a number of times that the user engages in predetermined types of behavior associated with relatively high risk levels, wherein a first of the predetermined types of behavior associated with relatively high risk levels is based on improper password management.

2. The computer-implemented method of claim 1, wherein the data viewing privileges and the data amending privileges are administrator privileges.

3. The computer-implemented method of claim 2, wherein the adjustment is made in response to a determination that the risk levels exceed a first predetermined threshold.

4. The computer-implemented method of claim 1, wherein adjusting the role-based access control of the user includes: reducing administrator privileges of the user in response to a determination that the risk levels exceed a first predetermined threshold and in response to a determination that second risk levels associated with previous behavior data of the user also exceed the first predetermined threshold.

5. The computer-implemented method of claim 1, comprising: determining, based on the results of the simulating, data and/or an infrastructure that are potentially vulnerable to the predicted role-based risk events, wherein adjusting the role-based access control of the user includes: adding a security layer to the data and/or to the infrastructure and reducing administrator privileges of the user, wherein the adjusting is performed in response to a determination that the risk levels exceed a first predetermined threshold.

6. The computer-implemented method of claim 1, comprising: outputting, a predetermined task suggestion to reinforce user behavior associated with a low risk level; determining whether the user has completed the predetermined task within a predetermined amount of time; and in response to a determination that the user has completed the predetermined task within the predetermined amount of time, reverting the role-based access control of the user.

7. The computer-implemented method of claim 1, wherein the data viewing privileges and the data amending privileges are administrator privileges, wherein the adjustment is made in response to a determination that the risk levels exceed a first predetermined threshold, wherein the user currently has a supervised capacity as a result of losing an administrative capacity previously held by the user, wherein the loss of the administrative capacity is based on improper behavior of the user on the at least one device, wherein generating the risk levels associated with the behavior data includes comparing the behavior data with at least some behaviors predetermined to be within a scope of at-risk user behavior related to cybersecurity, and comprising: determining whether the user's behavior includes a first type of the improper behavior, wherein the first type of improper behavior is outside the scope of at-risk user behavior related to cybersecurity, wherein the first type of improper behavior is still considered risky based on a time of day that the first type of improper behavior occurs; and in response to a determination that the user's behavior includes the first type of improper behavior, outputting a warning that discourages the first type of improper behavior.

8. The computer-implemented method of claim 1, comprising: assigning a second user of the at least one device a second risk and privacy tolerance, wherein the first risk and privacy tolerance is different than the second risk and privacy tolerance.

9. The computer-implemented method of claim 1, comprising:

receiving, second behavior data associated with subsequent behavior of the user on at least one device, wherein the user's subsequent behavior occurs on a second application;

generating second risk levels associated with the second behavior data;

predicting second role-based risk events based on the second behavior data;

simulating the second role-based risk events based on the second risk levels; and readjusting the user's role-based access control, wherein the readjustment is based on the simulation of the second role-based risk events based on the second risk levels, wherein the readjustment is based on an assigned second risk and privacy tolerance that is assigned to the user and specific to the user's behavior on the second application, wherein a strictness of the second risk and privacy tolerance is proportional to a number of times that the user engages in improper password management behavior.

10. A computer program product for adjusting role-based access control, the computer program product comprising a computer readable storage medium having program instructions embodied therewith, the program instructions readable and/or executable by a computer to cause the computer to:

receive, by the computer, behavior data associated with a user's behavior on a first application on at least one device;

generate, by the computer, for each instance of behavior in the behavior data, a risk level associated with the behavior data;

predict, by the computer, role-based risk events based on the behavior data;

simulate, by the computer, the role-based risk events based on the risk levels; and adjust, by the computer, role-based access control of the user based on results of the simulating and a strictness of a first risk and privacy tolerance that is assigned to the user and specific to the user's behavior on the first application, wherein the adjustment includes maintaining data viewing privileges of the user and revoking data amending privileges of the user, wherein the strictness of the first risk and privacy tolerance is proportional to a number of times that the user engages in predetermined types of behavior associated with relatively high risk levels, wherein a first of the predetermined types of behavior associated with relatively high risk levels is based on improper password management.

11. The computer program product of claim 10, wherein the data viewing privileges and the data amending privileges are administrator privileges.

12. The computer program product of claim 11, wherein the adjustment is made in response to a determination that the risk levels exceed a first predetermined threshold.

13. The computer program product of claim 10, wherein adjusting the role-based access control of the user includes: reducing administrator privileges of the user in response to a determination that the risk levels exceed a first predetermined threshold, and reducing the administrator privileges of the user by a greater amount each time that the user engages in behavior that is associated with risk levels that exceed the first predetermined threshold.

14. The computer program product of claim 10, the program instructions readable and/or executable by the computer to cause the computer to: determine, by the computer, based on the results of the simulating, data and/or an infrastructure that are potentially vulnerable to the predicted role-based risk events, wherein adjusting the role-based access control of the user includes: adding a security layer to the data and/or to the infrastructure and reducing administrator privileges of the user, wherein the adjusting is performed in response to a determination that the risk levels exceed a first predetermined threshold.

15. The computer program product of claim 10, the program instructions readable and/or executable by the computer to cause the computer to: output, by the computer, a predetermined task suggestion to reinforce user behavior associated with a low risk level; determine, by the computer, whether the user has completed the predetermined task within a predetermined amount of time; and in response to a determination that the user has completed the predetermined task within the predetermined amount of time, revert, by the computer, the role-based access control of the user.

16. The computer program product of claim 10, wherein the data viewing privileges and the data amending privileges are administrator privileges, wherein the adjustment is made in response to a determination that the risk levels exceed a first predetermined threshold, wherein the user currently has a supervised capacity as a result of losing an administrative capacity previously held by the user, wherein the loss of the administrative capacity is based on improper behavior of the user on the at least one device, wherein generating the risk levels associated with the behavior data includes comparing the behavior data with at least some behaviors predetermined to be within a scope of at-risk user behavior related to cybersecurity, and the program instructions readable and/or executable by the computer to cause the computer to: determine, by the computer, whether the user's behavior includes a first type of the improper behavior, wherein the first type of improper behavior is outside the scope of at-risk user behavior related to cybersecurity, wherein the first type of improper behavior is still considered risky based on a time of day that the first type of improper behavior occurs; and in response to a determination that the user's behavior includes the first type of improper behavior, outputting, by the computer, a warning that discourages the first type of improper behavior.

17. The computer program product of claim 10, the program instructions readable and/or executable by the computer to cause the computer to: assign, by the computer, a second user of the at least one device a second risk and privacy tolerance having a second predetermined threshold, wherein the first risk and privacy tolerance is different than the second risk and privacy tolerance.

18. The computer program product of claim 10, the program instructions readable and/or executable by the computer to cause the computer to:
receive, by the computer, second behavior data associated with subsequent behavior of the user on at least one device, wherein the user's subsequent behavior occurs on a second application;
generate, by the computer, second risk levels associated with the second behavior data;
predict, by the computer, second role-based risk events based on the second behavior data;
simulate, by the computer, the second role-based risk events based on the second risk levels; and
readjust, by the computer, the user's role-based access control,
wherein the readjustment is based on the simulation of the second role-based risk events based on the second risk levels,
wherein the readjustment is based on an assigned second risk and privacy tolerance that is assigned to the user and specific to the user's behavior on the second application,
wherein a strictness of the second risk and privacy tolerance is proportional to a number of times that the user engages in improper password management behavior.

19. A system, comprising:
a hardware processor; and
logic integrated with the hardware processor, executable by the hardware processor, or integrated with and executable by the hardware processor, the logic being configured to:
receive behavior data associated with a user's behavior on a first application on at least one device;
generate, for each instance of behavior in the behavior data, a risk level associated with the behavior data;
predict role-based risk events based on the behavior data;
simulate the role-based risk events based on the risk levels; and
adjust role-based access control of the user based on results of the simulating and a strictness of a first risk and privacy tolerance that is assigned to the user and specific to the user's behavior on the first application, wherein the adjustment includes maintaining data viewing privileges of the user and revoking data amending privileges of the user,
wherein the strictness of the first risk and privacy tolerance is proportional to a number of times that the user engages in predetermined types of behavior associated with relatively high risk levels, wherein a first of the predetermined types of behavior associated with relatively high risk levels is based on improper password management.

20. The system of claim 19, wherein the data viewing privileges and the data amending privileges are administrator privileges.

21. The system of claim 20, wherein the adjustment is made in response to a determination that the risk levels exceed a first predetermined threshold.

22. The system of claim 19, wherein adjusting the role-based access control of the user includes: reducing administrator privileges of the user in response to a determination that the risk levels exceed a first predetermined threshold, and reducing the administrator privileges of the user by a greater amount each time that the user engages in behavior that is associated with risk levels that exceed the first predetermined threshold.

23. The system of claim 19, the logic being configured to: determine, based on the results of the simulating, data and/or an infrastructure that are potentially vulnerable to the predicted role-based risk events, wherein adjusting the role-based access control of the user includes: adding a security layer to the data and/or to the infrastructure and reducing administrator privileges of the user, wherein the adjusting is performed in response to a determination that the risk levels exceed a first predetermined threshold.

24. The system of claim 19, the logic being configured to: output a predetermined task suggestion to reinforce user behavior associated with a low risk level; determine whether the user has completed the predetermined task within a predetermined amount of time; and in response to a determination that the user has completed the predetermined task within the predetermined amount of time, revert the role-based access control of the user.

25. The system of claim 19, wherein the data viewing privileges and the data amending privileges are administrator privileges, wherein the adjustment is made in response to a determination that the risk levels exceed a first predetermined threshold, wherein the user currently has a supervised capacity as a result of losing an administrative capacity previously held by the user, wherein the loss of the administrative capacity is based on improper behavior of the user on the at least one device, wherein generating the risk levels associated with the behavior data includes comparing the behavior data with at least some behaviors predetermined to be within a scope of at-risk user behavior related to cybersecurity, and the logic being configured to: determine whether the user's behavior includes a first type of the improper behavior, wherein the first type of improper behavior is outside the scope of at-risk user behavior related to cybersecurity, wherein the first type of improper behavior is still considered risky based on a time of day that the first type of improper behavior occurs; and in response to a determination that the user's behavior includes the first type of improper behavior, take an action responsive thereto, wherein the action includes output, to a user device of a second user, a notification of about the user's first type of improper behavior.

* * * * *